United States Patent [19]

Ballard

[11] Patent Number: 4,618,308

[45] Date of Patent: Oct. 21, 1986

[54] CARPET HANDLING DEVICE

[76] Inventor: Lee J. Ballard, 1912 Armstrong Dr., Plano, Tex. 75074

[21] Appl. No.: 579,415

[22] Filed: Feb. 13, 1984

[51] Int. Cl.⁴ .............................................. B60P 1/00
[52] U.S. Cl. .................................. 414/532; 296/37.6; 224/42.42
[58] Field of Search ............... 414/529, 532, 523, 911; 296/37.6; 224/42.42 R; 198/790

[56] References Cited

U.S. PATENT DOCUMENTS

| | | | |
|---|---|---|---|
| 2,346,659 | 4/1944 | Bruce | 198/790 X |
| 2,716,499 | 8/1955 | Grant | 414/532 |
| 2,889,097 | 6/1959 | Broehl | 224/42.42 R |
| 3,268,099 | 8/1966 | Ajero et al. | 414/529 |
| 3,333,715 | 8/1967 | Hepburn et al. | 414/532 X |
| 3,756,544 | 9/1973 | Bader | 414/529 X |
| 4,411,349 | 10/1983 | Stedman et al. | 414/532 X |

Primary Examiner—Joseph E. Valenza
Assistant Examiner—David A. Bucci
Attorney, Agent, or Firm—Gerald G. Crutsinger; John F. Booth; Monty L. Ross

[57] ABSTRACT

A loader device for loading carpet rolls onto small trucks comprising a frame with a plurality of rollers mounted transversely thereon at spaced intervals along the length of the frame, the rollers being coupled together to be driven simultaneously in the same rotational direction by a variable speed reversible DC motor, the rollers having a textured surface to provide strong frictional engagement with the carpet rolls, the frame being adapted to fit wholly within the bed area of the truck with the tail gate closed when not in use and to slide to a loading position with one end extending over the open tail gate of the truck.

12 Claims, 2 Drawing Figures

CARPET HANDLING DEVICE

BACKGROUND OF THE INVENTION

This application relates to carpet handling devices and more particularly to a powered device to assist in loading and unloading carpet rolls onto and off of a vehicle and particularly vans or pickup trucks.

Carpet installers often work in small crews of from one to four men. Such crews and the carpet to be installed may often be transported to an installation site by a small truck such as a pickup truck or a van. New carpet usually comes in rolls between about 10 and 15 feet in length about 24 to 36 or more inches in diameter and weighing in excess of 300 pounds. Such rolls are heavy and unwieldy and particularly difficult to load and unload manually on small trucks. Because the carpet is rather soft or "spongy" in character, the heavy rolls are especially hard to move lengthwise into and out of the truck bed even on roller conveyors.

A forklift truck is generally employed at a warehouse to load rolls of carpet onto a vehicle for delivery to a site for installation. If a forklift truck or other suitable handling equipment is not available at the warehouse to load the carpet rolls, personnel will be available. However, at the work site where the carpet is to be installed, a forklift truck generally is not available.

In the present invention, a plurality of motor powered rollers of sufficient width to accommodate a carpet roll are provided in the bed and on the tailgate of the transport vehicle. A support shelf positions the rollers to support one or more rolls of carpet so that the weight of only one roll is on the rollers at a time.

If necessary, one end of the roll of carpet to be loaded is placed on a roller adjacent the tailgate of the vehicle. With the motor turned on to drive the rollers, it is then relatively easy for two men or even one to guide the other end of the carpet roll support on a dolly and guide it as the roll is pulled onto the truck by the turning loader rollers. The carpet roll then may be moved to the side onto a shelf provided in the truck bed so that a second roll of carpet may be loaded. The carpet may be unloaded by reverse procedure. When carpet rolls are not carried in the truck, the roll loader can easily be moved completely into the truck bed area and the tailgate closed.

It is an object then of the present invention to provide a powered device for unloading a roll of carpet suitable for use in small trucks or vans.

It is a further object to provide a powered carpet roll handling device which can be easily installed and removed from small trucks.

It is a still further object to provide a powered carpet roll handling device by means of which a single operator may unload carpet rolls from a small truck without the aid of an assistant.

BRIEF DESCRIPTION OF THE DRAWING

These and other objects and advantages of the present invention will become apparent from the following detailed description when read with reference to the accompanying drawing wherein.

DETAILED DESCRIPTION

Figure 1:
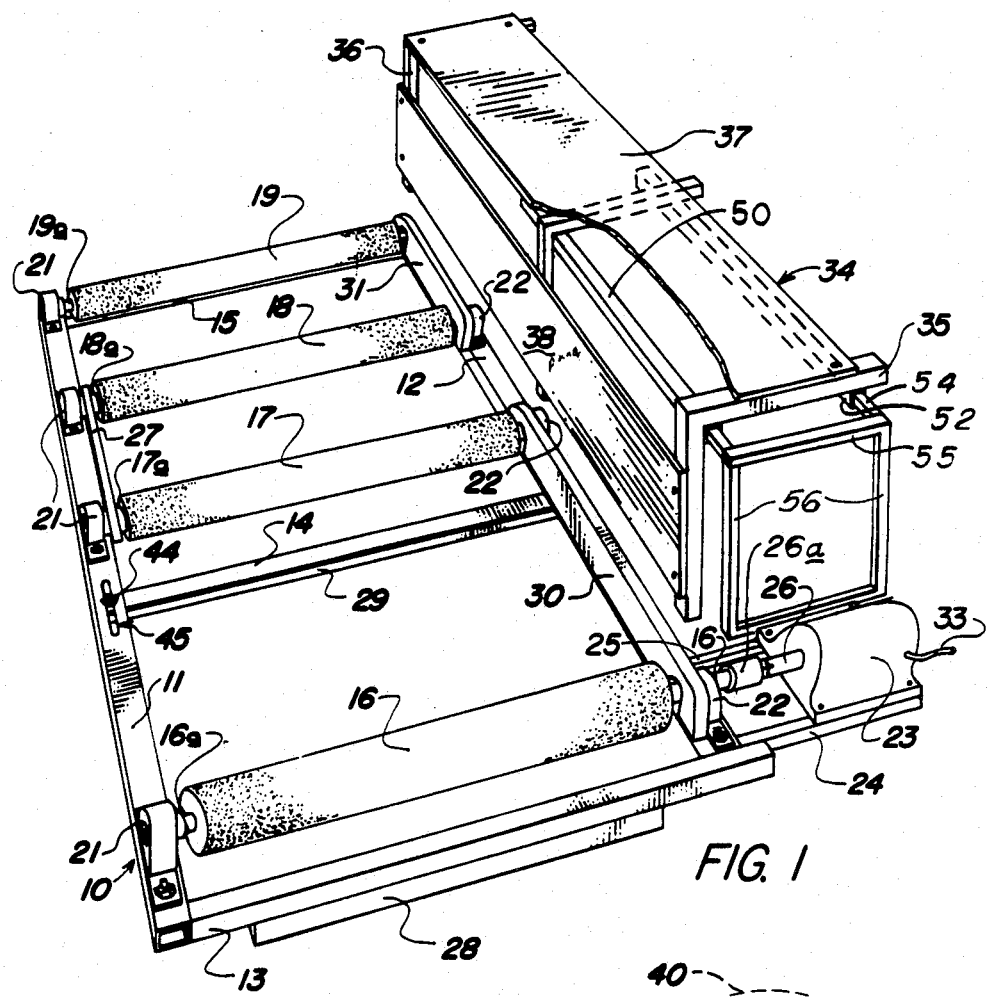
FIG. 1 is a perspective view of the carpet roll loader of the present invention.

Referring now to the drawings, the carpet roll loader designated generally as 10 comprises a frame having a pair of longitudinal members 11 and 12 interconnected by a plurality of cross members 13, 14 and 15. A plurality of rollers 16, 17, 18 and 19 are rotatably supported between bearing blocks 21 on frame member 11 and bearing blocks 22 on frame member 12. The rollers are preferably spaced at intervals of from 15 to 24 inches so that the carpet will not sag excessively between rollers. The rollers are integral with or keyed to their respective shafts 16a, 17a, 18a, and 19a. The surface of each of the rollers 16–19 is of a coarse or roughened texture to provide a high coefficient of friction between the roller and a carpet roll. Such a surface may be formed on the roller, provided by a coating adherent to the roller, or on a cover secured to the roller.

A small electric motor 23 is mounted on two frame extension members 24 and 25 detachably secured to frame member 12. The drive shaft 26 of motor 23 is drivingly connected to roller shaft 16a by a quick-connect coupling 26a which has a non-circular socket formed therein to slidably receive the non-circular shaped end of shaft 16. The end of shaft 16 is preferably square or hexagon shaped. However, it may be of other shapes, so long as it can transmit torque from coupling 26a to shaft 16a. The motor 23 is a variable speed reversible DC motor, preferably operable from the electrical power system of the truck on which the loader is used. The motor controls, while not shown, are the standard type and may be conveniently installed on one end of a control cable 33 which may be several feet in length.

Keyed to each roller shaft on its right end (as viewed in the drawing) is a chain drive sprocket. Additional sprockets are keyed to the left end of roller shafts 17a and 18a. Continuous drive chains link the sprockets on the right ends of roller shafts 16a and 17a, the sprockets on the right ends of roller shafts 18a and 19a and the sprockets on the left ends of roller shafts 17a and 18a. The chain 27 linking the sprocket shafts 17a and 18a is visible in FIG. 1, while the chains extending around sprockets on the right end of rollers 16 and 17 and of rollers 18 and 19 are hidden by chain covers 30 and 31 mounted on longitudinal member 12. Inasmuch as all of the sprockets are of the same size, motor 23 will drive all four rollers 16–19 at the same speed and in the same direction.

The loader 11 is designed to rest fully in the bed area of a small truck, such as a pickup truck with the tailgate closed, when not in use. The loader 11, however, is not permanently anchored to the truck so that when it is desired to put the loader into use, it may be pulled out over the open tailgate of the truck with the lip 28 of the frame cross member 13 hanging over the edge of the tailgate.

The frame cross member 14 has a "T" shaped cross section and is positioned relative to the lip 28 such that the downwardly projecting stem 29 of the "T" extends into the space between the tailgate and the truck bed when the loader is in its operating position. The loader is thus well anchored to prevent movement or sliding back and forth in the truck bed during the loading or unloading operation.

Since it may be desired to use the loader of the present invention in different trucks at different times, the cross member 14 may be made adjustable in position so that different sizes of truck beds and tailgates may be accommodated. Position adjustable mounting of cross member 14 may be a bolt and wing nut 44 anchoring one end of the member 14 at a desired location along mounting slot 45 in longitudinal member 11. The other end of member 14 is anchored to longitudinal member 12 by similar arrangement.

To load a roll of carpet, one end of the roll is placed on the roller 16 and the other end is preferably supported by a forklift truck. Motor 23 is then started and the motor driven rollers 16, 17, 18 and 19 move the roll across it, the operator may use the rollers to pull the roll into the truck until the end of the roll is positioned adjacent the front end wall of the truck bed. The loaded carpet roll may then be rolled up onto shelf 34 to make way for loading another roll if a forklift is not available. The drive chain covers 30 and 31 prevent the carpet of the roll from coming into contact with the ordinarily greasy drive chains. If it is found desirable, a cover may be supplied also over drive chain 27.

Figure 2:
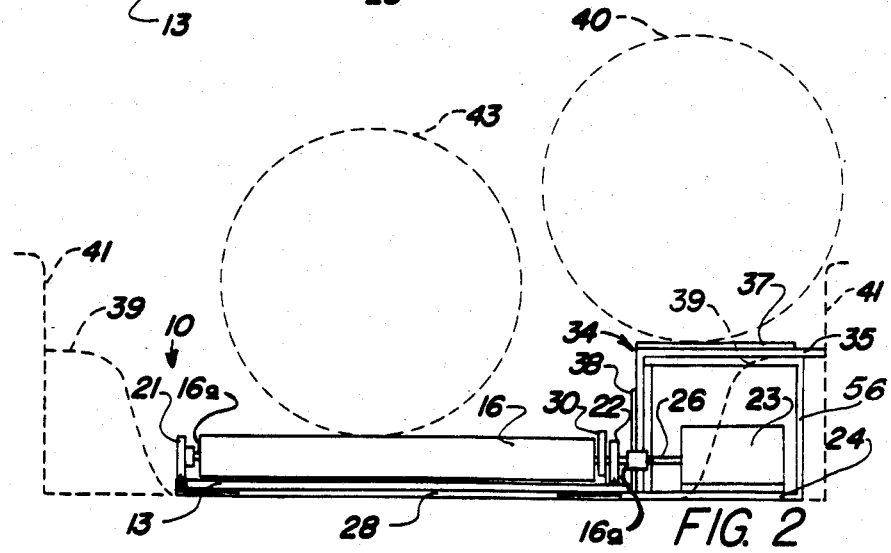
FIG. 2 is an end view of the carpet roll loader of FIG. 1 as it would rest in a transport truck.

As seen in the two figures, the shelf 34 may comprise a pair of L-shaped frame members 35 and 36 supporting two or more panel members 37 and 38. As best seen in FIG. 2 the upper portion of shelf 34 may rest against and be attached to one of the wheel wells 39 of the vehicle and will thus be supported in the proper position in the bed of the truck. With one loaded carpet roll 40 resting on the shelf 34 against the sidewall 41 of the truck bed, another carpet roll 43 may be loaded into the truck and left resting on the loader during transport. The primary function of shelf support 34 is to prevent binding of one roll of carpet.

Since the length of rolls of carpet vary, the shelf 34 is preferably equipped with an adjustable extension member which can be extended to support the outer end of the roll of carpet. In the embodiment illustrated in the drawing, hollow tubes 50 and 52 are welded or otherwise secured between L-shaped frame members 35 and 36. Support bars 54, having outer ends secured to member 55, are slidably disposed in tubes 50 and 52 to permit movement of support bars 54 and member 55 longitudinally relative to shelf 34. At least one leg 56 extends downwardly from member 55 to rest on the tailgate of the vehicle when member 55 is extended to support the end of a roll of carpet. In the illustrated embodiment, two legs 56 are provided to prevent twisting support bars 54 in guide tubes 50 and 52.

To off-load a carpet roll, motor 23 is started in the reverse direction. Rollers 16–19 then move the carpet roll out of the truck. The operator should support the leading end of the roll on a dolly as it becomes overbalanced to prevent the end from striking and scraping the ground. The motor may be stopped as the trailing end of the carpet roll approaches roller 16 or the motor may be left on until the roll is moved completely off of the loader and truck onto a second dolly. It should be readily apparent that a single operator can unload and move a large roll of carpet into a building without the assistance of a "helper" or assistant as hereinbefore described.

If it is deemed expedient to do so, a belt (not shown) may be mounted to extend from roller 16 to roller 19 to form a continuous moving surface to support and transport the roll of carpet if the carpet roll is extremely soft and flexible.

Many changes and modifications still within the spirit and scope of this invention will occur to those skilled in the art from reading the foregoing description of the preferred embodiment. Therefore, it is intended that this invention be limited only as set forth in the following claims.

What is claimed is:

1. A carpet roll handling device for use with a transport vehicle comprising: a frame adapted to rest wholly within the bed area of the transport vehicle with a tailgate of the vehicle in a closed position and to be moved to a position extending over the tailgate of the vehicle in a lowered open position for moving a roll of carpet relative to the vehicle; a cross member intermediate opposite ends of said frame, said cross-member having a downwardly projecting lip member adapted to be received in a space between the bed of the transport vehicle and the lowered tailgate of the vehicle; a plurality of rollers mounted transversely at spaced intervals along the length of said frame and coupled to be driven simultaneously in rotational motion in the same direction, said rollers having surfaces textured to provide a high coefficient of friction upon engagement with a roll of carpet; and reversible drive means coupled to provide rotational drive to said rollers.

2. The loader device of claim 1 wherein at least one of said rollers is positioned near an outer end of said frame when said loader is positioned for use on the transport vehicle.

3. The loader device of claim 2 wherein said rollers are coupled for simultaneous rotational drive by sprocket and chain drive means.

4. The loader device of claim 3 wherein said reversible drive means comprises a variable speed electric motor.

5. The loader device of claim 4 with the addition of conductor means connecting said motor to the transport vehicle electrical system.

6. The loader device of claim 1 with the addition of: means movably securing said cross-member to said frame such that said cross member is positionally adjustable along the length of said frame to position said first roller relative to an open tailgate of the vehicle.

7. The loader device of claim 1 with the addition of support means adjacent ends of the rollers, said support means being positioned such that a roll resting on the support means is positioned at a higher elevation than a roll resting on the rollers.

8. The loader device of claim 1 with the addition of: anchor means on an end of said elongated frame, said anchor means being spaced from said downwardly projecting lip such that the downwardly projecting lip and said anchor means are positioned adjacent opposite sides of the tailgate of a vehicle.

9. A device for loading rolls of carpet on a vehicle comprising: an elongated frame; at least four rollers rotatably secured to extend transversably of said frame; a motor; means detachably securing said motor to said frame; a quick-connect coupling driven by said motor and having a non-circular socket formed therein to receive a non-circular shaped end of a shaft of a first of said rollers for detachably securing said motor to a first of said rollers; a first drive means drivingly connecting the first and second rollers together; a second drive means drivingly connecting the second and third rollers together; third drive means drivingly connecting the third and fourth rollers together, said second drive means being connected such that said second, third and fourth rollers are driven as a group of rollers in series and the group of rollers is driven in parallel with the first roller; first anchor means on an end of said elongated frame to limit movement of said frame longitudinally relative to the vehicle; and second anchor means intermediate opposite ends of said elongated frame and spaced between said first and second rollers to limit movement of said frame relative to the vehicle when said first roller is positioned on an open vehicle tailgate and said first anchor means is positioned adjacent an edge of the tailgate of the vehicle such that the tailgate is positioned between said first and second anchor means.

10. The loader of claim 9 with the addition of support means extending longitudinally of one side of the elongated frame and positionable over a vehicle wheelwell to support a roll of carpet adjacent ends of the rollers and above the motor.

11. A carpet handling device for use with a transport vehicle comprising a frame with a cross member having a downwardly projecting lip member adapted to be received in a space between the bed of the transport vehicle and the lowered tailgate of said vehicle; a plurality of rollers mounted transversely at spaced intervals along the length of said frame and coupled to be driven simultaneously in rotational motion in the same direction, said rollers having surfaces textured to provide a high coefficient of friction upon engagement with a product to be loaded; support means adjacent ends of the rollers, said support means being positioned such that a roll of carpet resting on the support means is positioned at a higher elevation than a roll of carpet resting on the rollers; a support ledge on said support means which is movable to support rolls of carpet of various lengths; and reversible drive means coupled to provide rotational drive to said rollers.

12. A device for loading rolls of carpet on a vehicle comprising: an elongated frame; first anchor means on an end of said elongated frame to limit movement of said frame longitudinally relative to a vehicle; at least four rollers rotatably secured to extend transversably of said frame; a reversible variable speed motor; support means extending longitudinally of one side of the elongated frame and positionable over a vehicle wheel well to support a roll of carpet adjacent ends of the rollers and above the motor, said support means including a pair of support bars slidably secured to said support means and extensible to support the end of a roll of carpet above an open vehicle tailgate; means detachably securing said motor to said frame; a quick-connect coupling detachably securing said motor to a first of said rollers; a first drive means drivingly connecting first and second rollers together; second anchor means intermediate opposite ends of said elongated frame and spaced between said first and second rollers to limit movement of said frame relative to a vehicle when said first roller is positioned on an open vehicle tailgate; a second drive means drivingly connecting the second and third rollers together; third drive means drivingly connecting the third and fourth rollers together, said second drive means being connected such that said second, third and fourth rollers are driven as a group of rollers in series and the group of rollers is driven in parallel with the first roller.

* * * * *